United States Patent
Wang et al.

(10) Patent No.: US 11,873,397 B2
(45) Date of Patent: Jan. 16, 2024

(54) HETEROPHASIC POLYOLEFIN COMPOSITION

(71) Applicant: BOREALIS AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Matthias Hoff, Linz (AT)

(73) Assignee: Borealis AG, Vienna (AT)

( * ) Notice: Subject to any disclaimer, the term of this patent is extended or adjusted under 35 U.S.C. 154(b) by 245 days.

(21) Appl. No.: 17/292,063

(22) PCT Filed: Nov. 14, 2019

(86) PCT No.: PCT/EP2019/081321
§ 371 (c)(1),
(2) Date: May 7, 2021

(87) PCT Pub. No.: WO2020/099562
PCT Pub. Date: May 22, 2020

(65) Prior Publication Data
US 2021/0395512 A1    Dec. 23, 2021

(30) Foreign Application Priority Data
Nov. 15, 2018 (EP) ..................... 18206441

(51) Int. Cl.
C08L 53/00    (2006.01)
C08F 297/08   (2006.01)
C08J 5/18     (2006.01)

(52) U.S. Cl.
CPC .......... *C08L 53/00* (2013.01); *C08F 297/083* (2013.01); *C08J 5/18* (2013.01); *C08F 2420/00* (2013.01); *C08J 2353/00* (2013.01); *C08J 2423/06* (2013.01); *C08L 2203/16* (2013.01); *C08L 2205/03* (2013.01); *C08L 2314/06* (2013.01)

(58) Field of Classification Search
CPC .. C08L 2314/06; C08L 23/14; C08F 2420/00; C08J 2423/04; C08J 2423/06; C08J 2423/242308
See application file for complete search history.

(56) References Cited

U.S. PATENT DOCUMENTS

| | | |
|---|---|---|
| 3,242,150 A | 3/1966 | Scoggin |
| 3,324,093 A | 6/1967 | Alleman |
| 3,374,211 A | 3/1968 | Marwil et al. |
| 3,405,109 A | 10/1968 | Rohlfing |
| 4,582,816 A | 4/1986 | Miro |
| 5,391,654 A | 2/1995 | Ahvenainen et al. |
| 2005/0214558 A1 | 9/2005 | Rodick |

FOREIGN PATENT DOCUMENTS

| | | |
|---|---|---|
| CN | 107805349 A | 3/2018 |
| EP | 0479186 | 4/1992 |
| EP | 0517868 | 11/1995 |
| EP | 0575465 | 4/1997 |
| EP | 0887379 | 12/1998 |
| EP | 0891990 | 1/1999 |
| EP | 0895526 | 5/2003 |
| EP | 1310295 | 5/2003 |
| EP | 1415999 | 5/2004 |
| EP | 1591460 | 11/2005 |
| EP | 1630196 | 12/2007 |
| EP | 1833909 | 12/2008 |
| EP | 1820821 | 2/2012 |
| EP | 2424729 | 5/2013 |
| EP | 2586801 | 12/2014 |
| EP | 2831168 | 8/2016 |
| EP | 3257877 | 12/2017 |
| EP | 3257878 | 12/2017 |
| WO | 96/19503 | 6/1996 |
| WO | 96/32420 | 10/1996 |
| WO | 2001077224 A1 | 10/2001 |
| WO | 2003002625 A1 | 1/2003 |
| WO | 03/051934 | 6/2003 |
| WO | 2006/069733 | 7/2006 |
| WO | 2007/025640 | 3/2007 |
| WO | 2010/052260 | 5/2010 |
| WO | 2010/052263 | 5/2010 |
| WO | 2010/052264 | 5/2010 |
| WO | 2013/007650 | 1/2013 |
| WO | 2018030495 A1 | 2/2018 |

OTHER PUBLICATIONS

Office Action dated Dec. 19, 2022 in Chinese Application No. 201980083187.7 and English translation.
International Search Report and Written Opinion issued for Application No. PCT/EP2019/081321, dated Feb. 21, 2020.
Klimke, Katja, et al. "Optimisation and Application of Polyolefin Branch Quantification by Melt-State 13C NMR Spectroscopy." Macromolecular Chemistry and Physics 207.4 (2006): 382-395.
Parkinson, Matthew, et al. "Effect of Branch Length on 13C NMR Relaxation Properties in Molten Poly [ethylene-co-(α-olefin)] Model Systems." Macromolecular Chemistry and Physics 208.19-20 (2007): 2128-2133.
Castignolles, Patrice, et al. "Detection and quantification of branching in polyacrylates by size-exclusion chromatography (SEC) and melt-state 13C NMR spectroscopy." Polymer 50.11 (2009): 2373-2383.

(Continued)

*Primary Examiner* — Jeffrey C Mullis
(74) *Attorney, Agent, or Firm* — Meunier Carlin & Curfman LLC

(57) ABSTRACT

The invention provides a polyolefin composition comprising: (i) 55 to 95 wt % of a propylene butene random copolymer having an MFR$_2$ of 1.0 to 20.0 g/10 min, a butene content of 1.5 to 8.0 wt % and prepared using a single site catalyst; and (ii) to 45 wt % of an ethylene based plastomer having a density of 860 to 905 kg/m$^3$, an MFR$_2$ of 0.3 to 30 g/10 min and prepared using a single site catalyst.

16 Claims, No Drawings

(56) References Cited

OTHER PUBLICATIONS

Pollard, M., et al. "Observation of chain branching in polyethylene in the solid state and melt via 13C NMR spectroscopy and melt NMR relaxation time measurements." Macromolecules 37.3 (2004): 813-825.
Filip, Xenia, Carmen Tripon, and Claudiu Filip. "Heteronuclear decoupling under fast MAS by a rotor-synchronized Hahn-echo pulse train." Journal of Magnetic Resonance 176.2 (2005): 239-243.
Griffin, John M., et al. "Low-load rotor-synchronised Hahn-echo pulse train (RS-HEPT) 1H decoupling in solid-state NMR: factors affecting MAS spin-echo dephasing times." Magnetic Resonance in Chemistry 45.S1 (2007): S198-S208.
Randall, James C. "JMS-Rev." Macromol. Chem. Phys. C 29 (1989): 201-317.

HETEROPHASIC POLYOLEFIN COMPOSITION

CROSS-REFERENCE TO RELATED APPLICATIONS

This application is a United States National Phase Patent Application of International Patent Application Number PCT/EP2019/081321, filed on Nov. 14, 2019, which claims the benefit of priority to EP Application No. 18206441.0, filed Nov. 15, 2018.

FIELD OF THE INVENTION

This invention relates to a polyolefin composition comprising a propylene butene random copolymer and an ethylene based plastomer, in particular to a composition wherein both the propylene butene random copolymer and the ethylene based plastomer are prepared using a single site catalyst. The invention further relates to a process for preparing said composition and to articles, such as films or moulded articles, comprising said composition.

BACKGROUND

Polypropylene is widely used in moulding applications, including caps & closure, thin wall packaging, houseware and similar applications. In these applications a combination of high stiffness and good impact strength is required. Moreover, often also a low haze is targeted. These properties are also valuable for compositions intended for use in film applications, another area where the use of polypropylene copolymers is well known. The challenge, however, is to attain a composition which offers an attractive balance of all these properties.

Polymers with higher stiffness may allow for the use of lower film thicknesses, leading to both material and energy savings. Good impact behaviour is also essential so the contents of the packaging remain safely contained, even if dropped. Polymers with good optical properties, such as low haze, are desired in applications wherein is it important to the consumer to be able to see the content of the packaged goods through the packaging.

Polypropylene random copolymers are widely used in such packaging applications due to their good balance of properties. Typically these are copolymers of propylene and ethylene. Propylene butene copolymers are also known in packaging applications (e.g. as described in EP 3257878, EP 3257877), however the majority of these grades are made using Ziegler-Natta (ZN) catalysts. Disadvantages associated with the use of ZN catalysts is that they tend to produce a lot of oligomers and high comonomer contents are needed in order to achieve the low melting temperatures which are particularly desirable for film applications.

In order to fulfil the different requirements of the packaging, however, and provide the necessary balance of properties, the propylene copolymers are typically blended with other polyolefins. These modifications do not come without disadvantage, however. For example, including a rubber (elastomer) phase can improve impact strength but may reduce the stiffness and transparency of the resultant article. Examples of blends of propylene copolymers with elastomers are disclosed in EP 0575465. Again, many of these are prepared using Ziegler-Natta catalysts. Since the presence of the elastomer typically has adverse effects on the stiffness and transparency, attainment of an improved balance of properties often necessitates the inclusion of further elastomers or other polymers, resulting in blends of three or more polymers. For example, EP 2831168 and EP 1820821 employ a styrenic based elastomer. EP 0895526 and EP 1833909 used two different types of ethylene elastomers. These multi-component blends are necessarily more costly and time consuming to prepare.

It is thus an object of the present invention to provide a new polyolefin composition which can overcome at least some of the problems associated with those currently employed. A composition which offers an attractive balance of properties for application in the packaging field, particular as a moulded article or film, is looked-for. In particular, a composition which can offer these properties with the minimal number of components is desired. Preferably, more than one of these factors is achieved.

SUMMARY

Thus, in a first aspect, the invention provides a polyolefin composition comprising:
(i) 55 to 95 wt % of a propylene butene random copolymer having an $MFR_2$ of 1.0 to 20.0 g/10 min, a butene content of 1.5 to 8.0 wt % and prepared using a single site catalyst; and
(ii) 5 to 45 wt % of an ethylene based plastomer having a density of 860 to 905 kg/m$^3$, an $MFR_2$ of 0.3 to 30 g/10 min and prepared using a single site catalyst:

It is particularly preferred if the propylene butene random copolymer is a multimodal propylene butene random copolymer comprising:
(A) 30 to 70 wt % of a propylene butene copolymer having an $MFR_2$ of 0.5 to 20.0 g/10 min and a butene content of 0.5 to 10.0 wt %; and
(B) 70 to 30 wt % of a propylene butene copolymer having an $MFR_2$ of 0.5 to 20.0 g/10 min and a butene content of 1.0 to 8.0 wt %;
wherein copolymers (A) and (B) are different.

In a second aspect, the invention provides the process for the preparation of a polyolefin composition as hereinbefore defined comprising mixing and/or blending (e.g. by extrusion) the propylene butene random copolymer and the ethylene based plastomer.

It is particularly preferred if component (i) of the polyolefin composition as hereinbefore defined is prepared by a process comprising:
(i) polymerising propylene and butene in a first polymerisation stage in the presence of a single site catalyst to prepare a first propylene butene copolymer having a $MFR_2$ from 0.5 to 20.0 g/10 min and a butene content of 0.5 to 10.0 wt %;
(ii) polymerising propylene and butene in a second polymerisation stage in the presence of said catalyst and said first propylene butene copolymer to prepare said component (i).

In a third aspect, the invention provides an article, such as a film or a moulded article, comprising a polyolefin composition as hereinbefore defined.

DEFINITIONS

The term "ethylene based plastomer", as used herein, refers to a plastomer which comprises a majority amount of polymerised ethylene monomer (i.e. greater than 50 wt % based on the weight of the plastomer) and, optionally, may contain at least one comonomer. The term plastomer indicates rubber-like properties and the processability of plastic.

By "random" copolymer is meant a copolymer in which the comonomer units are randomly distributed within the copolymer. Specifically in the context of the present invention, the propylene butene random copolymer is thus a polymer in which the butene comonomer units are randomly distributed within the copolymer.

DETAILED DESCRIPTION

The polyolefin composition of the invention comprises a propylene butene random copolymer and an ethylene based plastomer. The composition may be defined as a heterophasic composition, meaning that two distinct phases are present, i.e. the propylene copolymer matrix phase and the plastomer phase. Presence of the two phases is easily detectable via DSC analysis: the crystalline propylene butene copolymer matrix will show a melting point higher than that of the plastomer component.

Propylene Butene Random Copolymer

The propylene butene random copolymer of the invention is a polypropylene, i.e. a polymer the majority by weight of which derives from propylene monomer units (i.e. at least 50 wt % propylene relative to the total weight of the copolymer). The comonomer is butene. The butene content in the copolymer is in the range 1.5 to 8.0 wt % relative to the total weight of the copolymer, preferably 2.0 to 7.0 wt %, more preferably 3.0 to 5.0 wt %.

Whilst it is within the ambit of the invention for the propylene butene random copolymer to comprise other copolymerisable monomers, it is preferable that propylene and butene are the only monomers present, i.e. butene is the only comonomer. It is especially preferred is the propylene butene copolymer is substantially free of ethylene, e.g. comprises less than 0.1 wt % ethylene, preferably less than 0.01 wt % ethylene, more preferably less than 0.001 wt %.

If present, other copolymerisable monomers may be ethylene or C5-12, especially C5-10, alpha olefin comonomers, particularly singly or multiply ethylenically unsaturated comonomers, in particular C5-10-alpha olefins such as hex-1-ene, oct-1-ene, and 4-methyl-pent-1-ene. The use of 1-hexene and 1-octene is particularly preferred.

The propylene butene random copolymer of the invention has a melt flow rate (MFR$_2$) of 1.0 to 20.0 g/10 min. Typically, the propylene butene random copolymer has an MFR$_2$ of 18.0 g/10 min or less, preferably 16.0 g/10 min or less, more preferably 10.0 g/10 min or less, such as 8.0 g/10 min or less. The polymer preferably has a minimum MFR$_2$ of 1.5 g/10 min, such as greater than 2.5 g/10 min, preferably at least 3.5 g/10 min, ideally at least 4.0 g/10 min, especially 5.0 g/10 min or more. Thus, particularly suitable values of MFR$_2$ are from 4.0 to 10.0 g/10 min, such as 5.0 to 8.0 g/10 min.

The density of the propylene butene random copolymer may typically be in the range 890 to 907 kg/m$^3$, ideally 900 to 905 kg/m$^3$.

The copolymer preferably has a molecular weight distribution Mw/Mn, being the ratio of the weight average molecular weight Mw and the number average molecular weight Mn, of less than 4.5, such as 2.0 to 4.0, e.g. 3.0.

The propylene butylene random copolymer preferably has a crystallisation temperature Tc of more than 95° C., more preferably from 100 to 120° C. and most preferably from 105° C. to 115° C.

The propylene butene random copolymer is present in the range 55 to 95 wt %, however typically it forms 58 to 92 wt %, preferably 65 to 88 wt %, such as 68 to 82 wt % of the polyolefin composition, wherein said wt % values are relative to the total weight of the composition as a whole.

In a particularly preferred embodiment, the propylene butene random copolymer is multimodal, such as bimodal.

It has been found that a multimodal propylene butene random copolymer provides a new material suitable for packaging applications, which combines very good mechanical properties e.g. in terms of stiffness (measured by tensile modulus), with attractive sealing properties (e.g. in terms of a low sealing temperature).

Usually, a polypropylene comprising at least two polypropylene fractions, which have been produced under different polymerisation conditions resulting in different (weight average) molecular weights and molecular weight distributions for the fractions or different comonomer distributions, is referred to as "multimodal". Accordingly, in this sense the propylene butene random compolymers of the invention are multimodal polypropylene. The prefix "multi" relates to the number of different polymer fractions the polymer is consisting of. Preferably, the polypropylene is bimodal, i.e. consisting of two polypropylene fractions (A) and (B).

In one embodiment of the invention, the propylene butene random copolymer preferably comprise at least two polypropylene fractions (A) and (B). In one particularly preferably embodiment, the copolymer consists of fractions (A) and (B). The weight ratio of fraction (A) to fraction (B) may be in the range 30:70 to 70:30, more preferably 35:65 to 65:35, most preferably 40:60 to 60:40. In some embodiments the ratio may be 45 to 55 wt % of fraction (A) and 55 to 45 wt % fraction (B), such as 50 wt % of fraction (A) and 50 wt % fraction (B).

It is a requirement of the invention that polymer fractions (A) and (B) are different.

In one particularly preferred embodiment, the propylene butene random copolymer is a multimodal propylene butene random copolymer comprising:

(A) 30 to 70 wt % of a propylene butene copolymer having an MFR$_2$ of 0.5 to 20.0 g/10 min and a butene content of 0.5 to 10.0 wt %; and (B) 70 to 30 wt % of a propylene butene copolymer having an MFR$_2$ of 0.5 to 20.0 g/10 min and a butene content of 1.0 to 8.0 wt %;

wherein copolymers (A) and (B) are different (i) Propylene Butene Copolymer (A)

Fraction (A) is a propylene butene copolymer component. Typically, fraction (A) consists of a single propylene butene copolymer. By propylene copolymer is meant a polymer the majority by weight of which derives from propylene monomer units (i.e. at least 50 wt % propylene relative to the total weight of the copolymer). The comonomer is butene. The butene content in copolymer (A) is in the range 0.5 to 10.0 wt % relative to the total weight of the copolymer, preferably 1.0 to 6.0 wt %, more preferably 2.0 to 5.5 wt %, such as 3.0 to 5.0 wt %.

Whilst it is within the ambit of the invention for the propylene butene copolymer (A) to comprise other copolymerisable monomers, it is preferable that propylene and butene are the only monomers present, i.e. butene is the only comonomer. It is especially preferred if copolymer (A) is substantially free of ethylene, e.g. comprises less than 0.1 wt % ethylene, preferably less than 0.01 wt % ethylene, more preferably less than 0.001 wt %.

If present, other copolymerisable monomers may be ethylene or C5-12, especially C5-10, alpha olefin comonomers, particularly singly or multiply ethylenically unsaturated comonomers, in particular C5-10-alpha olefins such as hex- 1-ene, oct-1-ene, and 4-methyl-pent-1-ene. The use of 1-hexene and 1-octene is particularly preferred.

The propylene butene copolymer (A) of the invention has a melt flow rate (MFR$_2$) of 0.5 to 20.0 g/10 min. Typically, the propylene butene copolymer (A) has an MFR$_2$ of 18.0 g/10 min or less, preferably 16.0 g/10 min or less, preferably 10.0 g/10 min or less, such as 8.0 g/10 min or less. The polymer preferably has a minimum MFR$_2$ of 1.0 g/10 min, such as greater than 1.5 g/10 min, preferably at least 2.0 g/10 min. Thus, particularly suitable values of MFR$_2$ are from 1.0 to 10.0 g/10 min, such as 2.0 to 8.0 g/10 min.

The propylene butene copolymer fraction (A) is present in an amount of 30 to 70 wt %, preferably 35 to 65 wt %, more preferably 40 to 60 wt %, such as 45 to 55 wt %, e.g. 50 wt %.

(ii) Propylene Butene Copolymer (B)

Fraction (B) is a propylene butene copolymer component. Typically, fraction (B) consists of a single propylene butene copolymer. By propylene copolymer is meant a polymer the majority by weight of which derives from propylene monomer units (i.e. at least 50 wt % propylene relative to the total weight of the copolymer). The comonomer is butene. The butene content in copolymer (B) is in the range 1.0 to 8.0 wt % relative to the total weight of the copolymer, preferably 1.5 to 6.0 wt %, more preferably 2.0 to 4.0 wt %. It is especially preferred if the comonomer content of Fraction (B) is less than the comonomer content of Fraction (A).

Whilst it is within the ambit of the invention for the propylene butene copolymer (B) to comprise other copolymerisable monomers, it is preferable that propylene and butene are the only monomers present, i.e. butene is the only comonomer. It is especially preferred if copolymer (B) is substantially free of ethylene, e.g. comprises less than 0.1 wt % ethylene, preferably less than 0.01 wt % ethylene, more preferably less than 0.001 wt %.

If present, other copolymerisable monomers may be ethylene or C5-12, especially C5-10, alpha olefin comonomers, particularly singly or multiply ethylenically unsaturated comonomers, in particular C5-10-alpha olefins such as hex-1-ene, oct-1-ene, and 4-methyl-pent-1-ene. The use of 1-hexene and 1-octene is particularly preferred.

The propylene butene copolymer (B) of the invention has a melt flow rate (MFR$_2$) of 0.5 to 20.0 g/10 min. Typically, the propylene butene copolymer (A) has an MFR$_2$ of 18.0 g/10 min or less, preferably 16.0 g/10 min or less, preferably 10.0 g/10 min or less, such as 8.0 g/10 min or less. The polymer preferably has a minimum MFR$_2$ of 1.0 g/10 min, such as greater than 1.5 g/10 min, preferably at least 2.0 g/10 min. Thus, particularly suitable values of MFR$_2$ are from 1.0 to 10.0 g/10 min, such as 2.0 to 8.0 g/10 min.

The propylene butene copolymer fraction (B) is present in an amount of 70 to 30 wt %, preferably 65 to 35 wt %, more preferably 60 to 40 wt %, such as 55 to 45 wt %, e.g. 50 wt %.

Preparation of Propylene Butene Random Copolymer

The propylene butene random copolymer may be prepared by any suitable method known in the art. The skilled person will be familiar with such polymer preparation methods.

Where the propylene butene random copolymer is a multimodal polymer, this multimodal copolymer may be prepared by any known process in the art, such as by blending the two fractions (A) and (B). However, preferably, the multimodal copolymer is produced in a multistage process wherein fractions (A) and (B) are produced in subsequent stages. The properties of the fractions produced in a higher stage of the multistage process may be calculated as follows.

The MFR of the second fraction (B), produced in the second reactor is determined according to $$\log(MFR(B)) = \frac{\log(MFR(PP-Copo)) - w(A) * \log(MFR(A))}{w(B)}$$

wherein

MFR (PP-Copo) denominates the MFR propylene butene copolymer w(A) and w(B) denominate the weight fractions of the first polypropylene fraction and second polypropylene fraction respectively MFR(A) denominates the MFR of the first polypropylene fraction (A) produced in the first reactor.

Thus, although not directly measurable on the multistage process products, the properties of the fractions produced in higher stages of such a multistage processes may be determined by applying the above method.

Multimodal propylene copolymers produced in a multistage process are also designated as "in-situ" blends. The resulting end product consists of an intimate mixture of the polymers from the two or more reactors. These two polymers may have different molecular-weight-distribution curves, and/or they may differ in terms of comonomer content or type. The end product thus contains a mixture or two or more polymers with differing properties, i.e. it is a multimodal polymer mixture In a particularly, preferred embodiment, the multimodal propylene copolymer is prepared by a process comprising:
  (i) polymerising propylene and butene in a first polymerisation stage in the presence of a single site catalyst to prepare a first propylene butene copolymer having a MFR$_2$ from 0.5 to 20.0 g/10 min and a butene content of 0.5 to 10.0 wt %;
  (ii) polymerising propylene and butene in a second polymerisation stage in the presence of said catalyst and said first propylene butene copolymer to prepare said multimodal propylene butene copolymer.

The first polymerisation stage is preferably a slurry polymerisation step. The slurry polymerisation usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The temperature in the first polymerisation stages is typically from 60 to 100° C., preferably from 70 to 90° C. An excessively high temperature should be avoided to prevent partial dissolution of the polymer into the diluent and the fouling of the reactor. The pressure is from 1 to 150 bar, preferably from 40 to 80 bar.

The slurry polymerisation may be conducted in any known reactor used for slurry polymerisation. Such reactors include a continuous stirred tank reactor and a loop reactor. It is especially preferred to conduct the polymerisation in a loop reactor. In such reactors the slurry is circulated with a high velocity along a closed pipe by using a circulation pump. Loop reactors are generally known in the art and examples are given, for instance, in U.S. Pat. Nos. 4,582, 816, 3,405,109, 3,324,093, EP-A-479186 and U.S. Pat. No.

5,391,654. It is thus preferred to conduct the first polymerisation stage as a slurry polymerisation in a loop reactor.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460. It is preferred to withdraw the slurry from the first polymerisation stage continuously.

Hydrogen is typically introduced into the first polymerisation stage for controlling the $MFR_2$ of the propylene butene copolymer (A). The amount of hydrogen needed to reach the desired MFR depends on the catalyst used and the polymerisation conditions, as will be appreciated by the skilled worker.

The average residence time in the first polymerisation stage is typically from 20 to 120 minutes, preferably from 30 to 80 minutes. As it is well known in the art the average residence time τ can be calculated from Equation 1 below:

$$\text{Residence Time } \tau = \frac{V_R}{Q_o} \qquad \text{Equation 1}$$

Where $V_R$ is the volume of the reaction space (in case of a loop reactor, the volume of the reactor, in case of the fluidized bed reactor, the volume of the fluidized bed) and $Q_o$ is the volumetric flow rate of the product stream (including the polymer product and the fluid reaction mixture).

The production rate is suitably controlled with the catalyst feed rate. It is also possible to influence the production rate by suitable selection of the monomer concentration. The desired monomer concentration can then be achieved by suitably adjusting the propylene feed rate.

The second polymerisation stage is preferably a gas phase polymerisation step, i.e. carried out in a gas-phase reactor. Any suitable gas phase reactor known in the art may be used, such as a fluidised bed gas phase reactor.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or low boiling point hydrocarbons such as propane together with monomer (e.g. ethylene).

A chain transfer agent (e.g. hydrogen) is typically added to the second polymerisation stage.

The split between the first and second polymerisation stages may be in the range 30:70 to 70:30, preferably 40:60 to 60:40, such as 45:55 to 55:45, for example 50:50.

A preferred multistage process is the above-identified slurry-gas phase process, such as developed by *Borealis* and known as the Borstar® technology. In this respect, reference is made to the EP applications EP 0887379 A1 and EP 0517868 A1.

The polymerisation steps discussed above may be preceded by a prepolymerisation step. The purpose of the prepolymerisation is to polymerise a small amount of polymer onto the catalyst at a low temperature and/or a low monomer concentration. By prepolymerisation it is possible to improve the performance of the catalyst in slurry and/or modify the properties of the final polymer. The prepolymerisation step is typically conducted in slurry.

Thus, the prepolymerisation step may be conducted in a loop reactor. The prepolymerisation is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerisation step is typically from 0 to 90° C., preferably from 20 to 80° C. and more preferably from 55 to 75° C.

The pressure is not critical and is typically from 1 to 150 bar, preferably from 40 to 80 bar.

The amount of monomer is typically such that from 0.1 to 1000 grams of monomer per one gram of solid catalyst component is polymerised in the prepolymerisation step. As the person skilled in the art knows, the catalyst particles recovered from a continuous prepolymerisation reactor do not all contain the same amount of prepolymer. Instead, each particle has its own characteristic amount which depends on the residence time of that particle in the prepolymerisation reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen as it is known in the art. Further, antistatic additives may be used to prevent the particles from adhering to each other or the walls of the reactor, as disclosed in WO-A-96/19503 and WO-A-96/32420.

The catalyst components are preferably all introduced to the prepolymerisation step when a prepolymerisation step is present. However, where the solid catalyst component and the cocatalyst can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

It is understood within the scope of the invention, that the amount of polymer produced in the prepolymerisation typically lies within 1.0-5.0 wt % in respect to the final multimodal propylene butene copolymer.

The propylene butene random copolymer is prepared in the presence of a single site catalyst (which term encompasses a metallocene and a non-metallocene catalyst). These terms have a well-known meaning. Most preferably, the catalyst is a metallocene.

Any metallocene catalyst capable of catalysing the formation of an olefinic polymer can be used. A suitable metallocene catalyst comprises a metallocene/activator reaction product impregnated in a porous support at maximum internal pore volume. The catalyst complex comprises a ligand which is typically bridged, and a transition metal of group IVa to VIa, and an organoaluminium compound. The catalytic metal compound is typically a metal halide.

Suitable metallocene compounds are those which have a formula $(Cp)_m R_n MR'_o X_p$, where Cp is an unsubstituted or substituted and/or fused homo or heterocyclopentadienyl, R is a group having 1-4 atoms and bridging two Cp rings, M is a transition metal of group 4, 5 or 6 in the Periodic Table of Elements (IUPAC, 1985), R' is $C_1$-$C_2$ hydrocarbyl or hydrocarboxy group and X is a halogen atom, wherein m is 1-3, n is 0 or 1, o is 0-3 and p is 0-3 and sum n+o+p corresponds the oxidation state of the transition metal M. The transition metal M is preferably zirconium, hafnium or titanium, most preferably zirconium.

Examples of suitable metallocene compounds include those of formula (I) or (II):

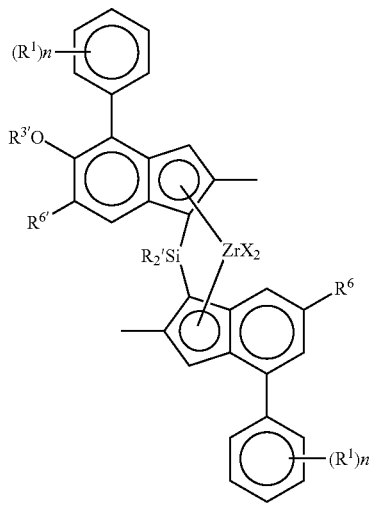

(I)

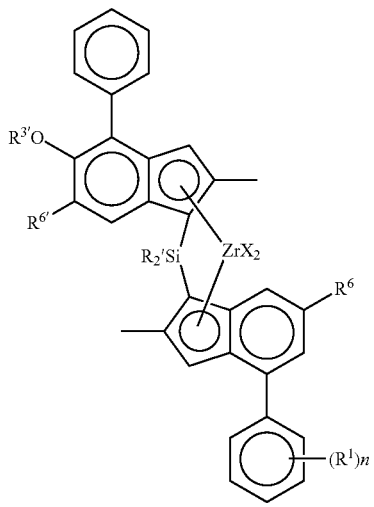

(II)

wherein each X is a sigma ligand, preferably each X is independently a hydrogen atom, a halogen atom, $C_{1-6}$-alkoxy group, $C_{1-6}$-alkyl, phenyl or benzyl group;

R' is independently a $C_{1-6}$ alkyl or $C_{3-10}$ cycloalkyl;

$R^1$ is independently $C_{3-8}$ alkyl;

$R^6$ is hydrogen or a $C_{3-8}$ alkyl group;

$R^{6'}$ is a $C_{3-8}$ alkyl group or $C_{6-10}$ aryl group, preferably a tertiary $C_{4-8}$ alkyl group;

$R^{3'}$ is a $C_{1-6}$ alkyl group, or $C_{6-10}$ aryl group optionally substituted by one or more halo groups; and n is independently 0, 1 or 2.

Particular metallocene compounds include:

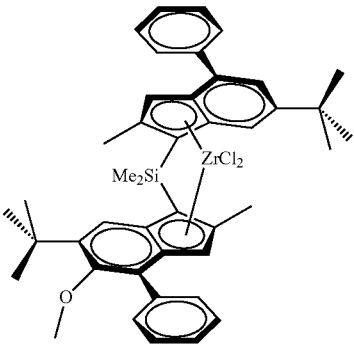

rac-anti-Me$_2$Si(2-
Me-4-Ph-6-tBu-
Ind)(2-Me-4-Ph-5-
OMe-6-tBu-
Ind)ZrCl$_2$

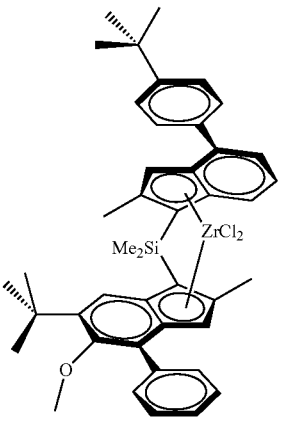

rac-anti-Me$_2$Si(2-
Me-4-(p-tBuPh)-
Ind)(2-Me-4-Ph-5-
OMe-6-tBu-
Ind)ZrCl$_2$

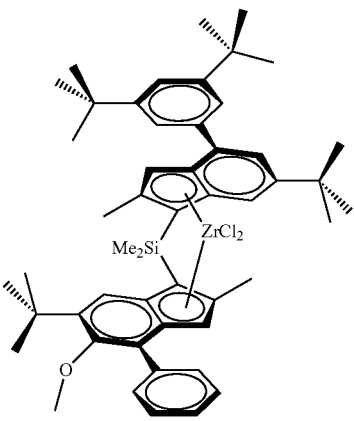

rac-anti-Me$_2$Si(2-
Me-4-(3,5-di-
tBuPh)-6-tBu-
Ind)(2-Me-4-Ph-5-
OMe-6-tBu-
Ind)ZrCl$_2$

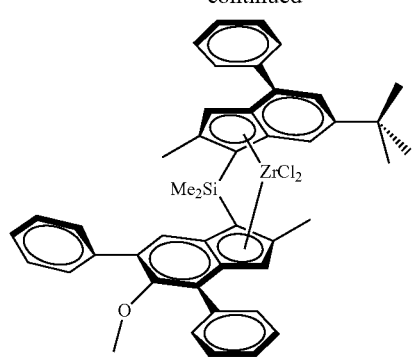
rac-anti-Me₂Si(2-
Me-4-Ph-6-tBu-
Ind)(2-Me-4,6-di-
Ph-5-OMe-
Ind)ZrCl₂
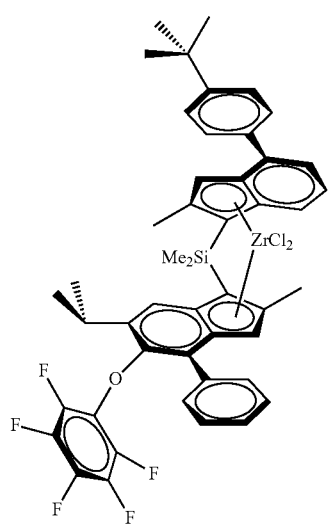
rac-anti-
Me₂Si(2-Me-4-
(p-tBuPh)-
Ind)(2-Me-4-
Ph-5-OC₆F₅)-6-
iPr-Ind)ZrCl₂
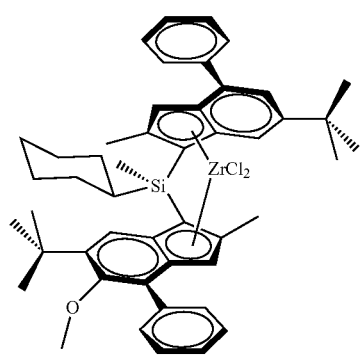
rac-anti-
Me(CyHex)Si(2-
Me-4-Ph-6-tBu-
Ind)(2-Me-4-Ph-
5-OMe-6-tBu-
Ind)ZrCl₂
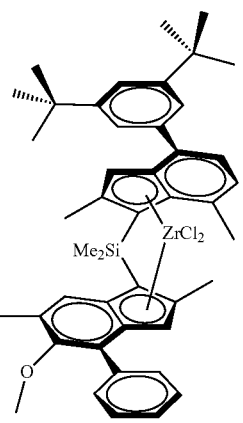
rac-anti-Me₂Si(2-
Me-4-(3,5-di-
tBuPh)-7-Me-
Ind)(2-Me-4-Ph-
5-OMe-6-tBu-
Ind)ZrCl₂
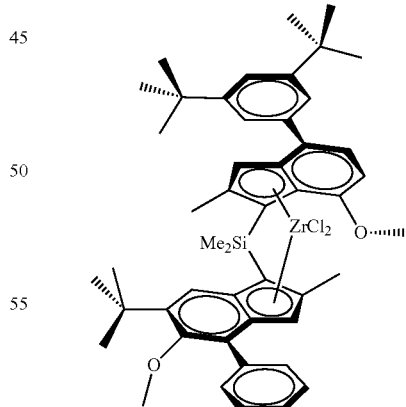
rac-anti-Me₂Si(2-
Me-4-(3,5-di-
tBuPh)-7-OMe-
Ind)(2-Me-4-Ph-
5-OMe-6-tBu-
Ind)ZrCl₂

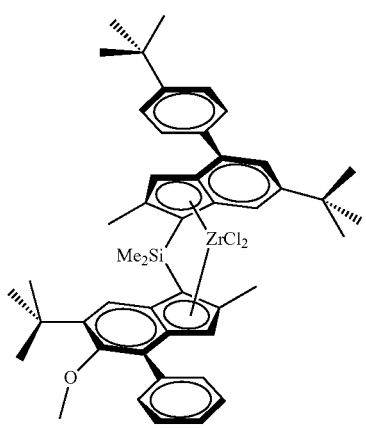
rac-anti-
Me₂Si(2-Me-4-
(p-tBuPh)-6-
tBu-Ind)(2-Me-
4-Ph-5-OMe-6-
tBu-Ind)ZrCl₂
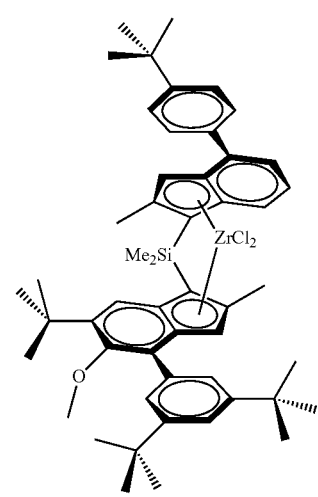
rac-anti-Me₂Si(2-
Me-4-(p-tBuPh)-
Ind)(2-Me-4-(3,5-tBu2Ph)-5-
OMe-6-tBu-
Ind)ZrCl₂
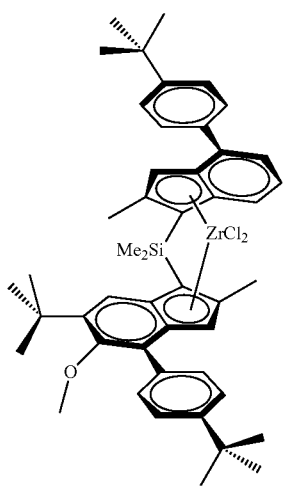
rac-anti-
Me₂Si(2-Me-4-
(p-tBuPh)-
Ind)(2-Me-4-(4-
tBuPh)-5-OMe-
6-tBu-Ind)ZrCl₂
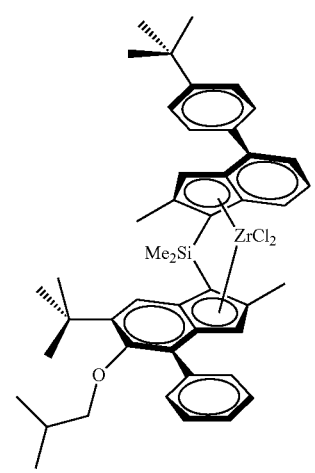
rac-anti-Me₂Si(2-
Me-4-(p-tBuPh)-
Ind)(2-Me-4-Ph-
5-OiBu-6-tBu-
Ind)ZrCl₂

Alternatively, the metallocene compound may be selected from: rac-anti-dimethylsilanediyl[2-methyl-4,7-bis-(3',5'-dimethyl phenyl)-1,5,6,7-tetrahydro-s-indacen-1-yl][2-methyl-4-(3',5'-dimethylphenyl)-5-methoxy-6-tert-butylinden-1-yl] zirconium dichloride

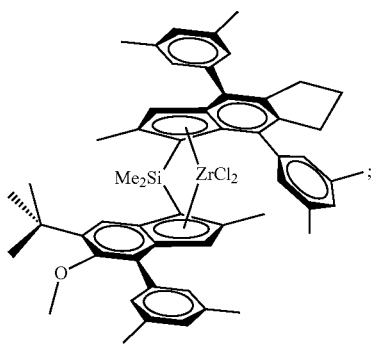

or
anti-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride

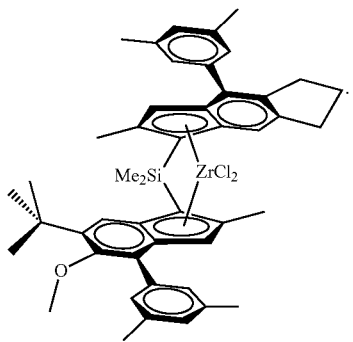

Most preferably rac-anti-Me$_2$Si(2-Me-4-(p-tBuPh)-Ind)(2-Me-4-Ph-5-OMe-6-tBu-Ind)ZrCl$_2$ is used.

Such metallocene catalysts are frequently used with catalyst activators or co-catalysts, e.g. alumoxanes such as methylaluminoxane, which are widely described in the literature.

The metallocene catalyst may be supported as is well known in the art. Any suitable support or carrier material can be used, which may be any porous, substantially inert support, such as an inorganic oxide or salt. In practice the support used is preferably a fine-grained inorganic oxide such as an inorganic oxide of an element of Group 2, 13 or 14 in the Periodic Table of Elements (IUPAC, 1985), most preferably silica, alumina or a mixture or derivative of these. Other inorganic oxides which can be used either alone or together with silica, alumina or silica-alumina, are magnesium oxide, titanium dioxide, zirconium oxide, aluminum phosphate etc.

Alternatively, the catalyst may be used in non-supported form or in solid form.

Non-supported catalyst systems, suitable for the present invention can be prepared in solution, for example in an aromatic solvent like toluene, by contacting the metallocene (as a solid or as a solution) with the cocatalyst(s), for example methylaluminoxane and/or a borane or a borate salt previously in an aromatic solvent, or can be prepared by sequentially adding the dissolved catalyst components to the polymerisation medium.

The catalyst system of the invention in solid form, preferably in solid particulate form is generally free from an external carrier, however still being in solid form. By free from an external carrier is meant that the catalyst does not contain an external support, such as an inorganic support, for example, silica or alumina, or an organic polymeric support material.

In order to provide the catalyst system of the invention in solid form but without using an external carrier, it is preferred if a liquid/liquid emulsion system is used. The process involves forming dispersing catalyst components (i) (the complex) and (ii)+optionally (iii) the cocatalysts) in a solvent, and solidifying said dispersed droplets to form solid particles. In particular, the method involves preparing a solution of the catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles. This process enables the manufacture of active catalyst particles with improved morphology, e.g. with a predetermined particle size, spherical shape, compact structure, excellent surface properties and without using any added external porous support material, such as an inorganic oxide, e.g. silica. The catalyst particles can have a smooth surface, they may be compact in nature and catalyst active components can be distributed uniformly thorough the catalyst particles. Full disclosure of the necessary process steps can be found in, for example, WO03/051934.

All or part of the preparation steps can be done in a continuous manner. Reference is made to WO2006/069733 describing principles of such a continuous or semicontinuous preparation methods of the solid catalyst types, prepared via emulsion/solidification method. The formed catalyst preferably has good stability/kinetics in terms of longevity of reaction, high activity and the catalysts enable low ash contents.

The use of the heterogeneous, non-supported catalysts, (i.e. "self-supported" catalysts) might have, as a drawback, a tendency to dissolve to some extent in the polymerisation media, i.e. some active catalyst components might leach out of the catalyst particles during slurry polymerisation, whereby the original good morphology of the catalyst might be lost. These leached catalyst components are very active possibly causing problems during polymerisation. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerisation which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerise" the catalyst before using it in polymerisation process. It has to be noted that prepolymerisation in this regard is part of the catalyst preparation process, being a step carried out after a solid catalyst is formed. This catalyst prepolymerisation step is not part of the actual polymerisation configuration, which might comprise a conventional process prepolymerisation step as well. After the catalyst prepolymerisation step, a solid catalyst is obtained and used in polymerisation.

Catalyst "prepolymerisation" takes place following the solidification step of the liquid-liquid emulsion process hereinbefore described. Prepolymerisation may take place by known methods described in the art, such as that described in WO 2010/052263, WO 2010/052260 or WO 2010/052264. Use of the catalyst prepolymerisation step offers the advantage of minimising leaching of catalyst components and thus local overheating.

The solvent employed in the processes of the invention may be any solvent suitable for use in olefin polymerisation and is typically a mixture of hydrocarbons. Such solvents are well known in the art. Examples of solvents include hexane, cyclohexane, isohexane, n-heptane, C8, C9 isoparaffins and mixtures thereof.

In one embodiment, the polymerisation is carried out in the presence of hydrogen. Hydrogen is typically employed to help control polymer properties, such as polymer molecular weight. In an alternative embodiment, hydrogen is not added in step i. The skilled worker will appreciate, however, that hydrogen may be generated during the polymerisation process. Thus, the hydrogen present in the polymerisation reaction mixture formed in step i. of the process may originate from hydrogen which has been added as a reactant and/or hydrogen produced as a side product during polymerisation.

It will be appreciated that the propylene polymers may contain standard polymer additives. These typically form less than 5.0 wt %, such as less than 2.0 wt % of the polymer material. Additives, such as antioxidants, phosphites, cling additives, pigments, colorants, fillers, anti-static agent, processing aids, clarifiers and the like may thus be added during the polymerisation process. These additives are well known in the industry and their use will be familiar to the artisan. Any additives which are present may be added as an isolated raw material or in a mixture with a carrier polymer, i.e. in so called master batch.

In one embodiment of the invention, the process for preparing the multimodal propylene butene random copolymer may further comprise a step of visbreaking. The term "visbreaking" will be well known to the person skilled in the art and relates to a process which results in a controlled breakdown of polymer chains, leading to rheological changes, typically an increase in $MFR_2$. Thus, the multimodal polymers of the invention may be subject to visbreaking to finely tune their rheological profile, as desired. Visbreaking may take place by several methods, as are well known in the art, such as thermal pyrolysis, exposure to ionising radiation or oxidising agents. In the context of the present invention, visbreaking is typically carried out using peroxides.

Ethylene Based Plastomer

The ethylene based plastomer has a density in the range of 0.860 to 0.905 g/cm$^3$ and an $MFR_2$ (190° C.) in the range 0.3-30 g/10 min. It will be understood that by "ethylene-based" plastomer, we mean a plastomer in which the majority by weight derives from ethylene monomer units. Suitable ethylene-based plastomers may have an ethylene content from 60 to 95 wt %, preferably from 65 to 90 wt % and more preferably from 70 to 88 wt %. The comonomer contribution preferably is up to 40 wt %, more preferably up to 35 wt %. The comonomer contents of conventional ethylene plastomers are familiar to the person skilled in the art.

The ethylene based plastomer is preferably a copolymer of ethylene and propylene or a $C_4$-$C_{10}$ alpha-olefin. Suitable $C_4$-$C_{10}$ alpha-olefins include 1-butene, 1-hexene and 1-octene, preferably 1-butene or 1-octene and more preferably 1-octene. Ideally there is only one comonomer present. Preferably copolymers of ethylene and 1-octene are used.

The density of the ethylene-based plastomer is in the range of 0.860 to 0.905 g/cm$^3$, preferably in the range of 0.865 to 0.903 g/cm$^3$, such as 0.870-0.902 g/cm$^3$. The $MFR_2$ (ISO 1133; 190° C.; 2.16 kg) of suitable ethylene based plastomers is in the range of 0.3-30 g/10 min, preferably in the range of 0.5-20.0 g/10 min and more preferably in the range of 1.0-15.0 g/min.

The melting points (measured with DSC according to ISO 11357-3:1999) of suitable ethylene based plastomers can be below 130° C., preferably below 120° C., more preferably below 110° C. and most preferably below 100° C. A reasonable lower limit for the melting points of suitable ethylene based plastomers may be 30° C. A typical melting point range is 33 to 115° C.

Furthermore suitable ethylene based plastomers may have a glass transition temperature Tg (measured with DMTA according to ISO 6721-7) of below −40° C., preferably below −54° C., more preferably below −58° C.

The Mw/Mn value of the ethylene based plastomer, representing the broadness of the molecular weight distribution (MWD), is preferably in the range of 1.5 to 5.0, more preferably in the range of 2.0 to 4.5, even more preferably in the range of 2.5 to 4.0.

The ethylene based plastomer can be unimodal or multimodal, preferably unimodal.

The PE plastomer is a single site (e.g. metallocene) catalysed polymer.

In one embodiment, the ethylene based plastomer is a thermoplastic plastomer.

Whilst it is within the ambit of the invention for a mixture of two or more ethylene based plastomers as defined herein to be employed, it is preferred if only a single ethylene based plastomer is used.

Suitable ethylene based plastomers can be any copolymer of ethylene and propylene or ethylene and $C_4$-$C_{10}$ alpha olefin having the above defined properties, which are commercial available, i.a. from *Borealis* AG (AT) under the tradename Queo, from DOW Chemical Corp (USA) under the tradename Engage or Affinity, or from Mitsui under the tradename Ta mer.

Alternatively, the ethylene based plastomer can be prepared by known processes, in a one stage or two stage polymerisation process, comprising solution polymerisation, slurry polymerisation, gas phase polymerisation or combinations therefrom, in the presence of suitable single-site catalysts, e.g. metallocene or constrained geometry catalysts, known to the art skilled persons.

Preferably these ethylene based plastomers are prepared by a one stage or two stage solution polymerisation process, especially by high temperature solution polymerisation process at temperatures higher than 100° C.

Such processes are essentially based on polymerising the monomer and a suitable comonomer in a liquid hydrocarbon solvent in which the resulting polymer is soluble. The polymerisation is carried out at a temperature above the melting point of the polymer, as a result of which a polymer solution is obtained. This solution is flashed in order to separate the polymer from the unreacted monomer and the solvent. The solvent is then recovered and recycled in the process. Preferably the solution polymerisation process is a high temperature solution polymerisation process, using a polymerisation temperature of higher than 100° C. Preferably the polymerisation temperature is at least 110°, more preferably at least 150° C. The polymerisation temperature can be up to 250° C.

The pressure in such a solution polymerisation process is preferably in a range of 10 to 100 bar, preferably 15 to 100 bar and more preferably 20 to 100 bar.

The liquid hydrocarbon solvent used is preferably a $C_{5-12}$-hydrocarbon which may be unsubstituted or substituted by a $C_{1-4}$ alkyl group such as pentane, methyl pentane, hexane, heptane, octane, cyclohexane, methylcyclohexane and hydrogenated naphtha. More preferably unsubstituted $C_{6-10}$-hydrocarbon solvents are used.

A known solution technology suitable for the process according to the invention is the Borceed technology.

It will be appreciated that the ethylene based plastomer may contain standard polymer additives. These additives are well known in the industry and their use will be familiar to the artisan. Any additives which are present may be added as an isolated raw material or in a mixture with a carrier polymer, i.e. in so called master batch.

The ethylene based plastomer may be present in the range 5 to 45 wt %, however typically it forms 8 to 42 wt % of the polyolefin composition, wherein said wt % values are relative to the total weight of the composition as a whole. In a preferable embodiment, the ethylene based plastomer forms 10 to 40 wt %, such as 10 to 35 wt % (relative to the total weight of the composition as a whole) of the polyolefin composition.

Polyolefin Composition

Preferably, the polyolefin composition has a melt flow rate ($MFR_2$) of 0.1 to 50 g/10 min. Typically, the composition has an $MFR_2$ of 20.0 g/10 min or less, preferably 10.0 g/10 min or less, preferably 5.0 g/10 min or less. The composition preferably has a minimum $MFR_2$ of 0.2 g/10 min, such as greater than 0.5 g/10 min, preferably at least 1.0 g/10 min, ideally at least 1.5 g/10 min. Thus, particularly suitable values of $MFR_2$ are from 0.5 to 10.0 g/10 min, such as 1.0 to 5.0 g/10 min.

Preferably, the polyolefin composition has a flexural modulus of at least 500 MPa, more preferably at least 550 MPa, such as at least 600 MPa. Typically, the composition has a flexural modulus of less than 1600 MPa, such as less than 1400 MPa.

The polyolefin composition according to the present invention preferably has a Charpy notched impact strength (measured on injection molded test specimens in accordance with ISO 179 1 eA at 23° C., short NIS (23° C.)) of above 10 kJ/m², more preferably above 12 kJ/m² and most preferably above 15 kJ/m². Usually the NIS (23° C.) will not be higher than 100 kJ/m², frequently not be higher than 90 kJ/m².

Haze (when measured on injection molded 1 mm plaques in accordance with ASTM D1003) of the inventive polyolefin composition is preferably below 40%, more preferably below 38% and most preferably below 36%. Usually haze of the inventive heterophasic polyolefin composition when measured in the described way will be above 15%, frequently above 20%.

The polyolefin composition according to the present invention preferably has an Optomechanical Ability (OMA+ 23° C.) when based on NIS (23° C.) of 300 or above, like in the range of 300-4000, preferably in the range of 400 to 3500, or more preferably in the range of 450-3000.

Especially preferred are values for OMA (+23° C.) in the range of 1000-4000, such as 1500-3500 or 2000 to 3000.

The polyolefin composition according to the present invention preferably has an Optomechanical Ability (OMA 0° C.) when based on NIS (0° C.) of 70 or above, like in the range of 70-2500, preferably in the range of 80 to 2300.

Especially preferred are ranges for OMA (0° C.) of 70-1000, like 80 to 800, such as 100-500.

Equally preferred are ranges for OMA (0° C.) of 1000-2500, such as 1300-2300, like 1500 to 2000.

Typically, the polyolefin composition will show two melting temperatures due to its heterophasic nature and the two components present therein. The skilled person will appreciate that the propylene butene random copolymer component will have a melting temperature higher than the plastomer component. Preferably, all melting temperatures for the composition of the invention are less than 150° C. In general, the upper melting temperature Tm1 (i.e. of the propylene butene random copolymer component) may be in the range of less than 150° C., such as less than 145° C. A typical range for Tm 1 would be 120 to 145° C. The lower melting temperature Tm2 (i.e. of the ethylene based plastomer component) may be in the range of less than 120° C., such as less than 100° C. A typical range for Tm 2 would be 70 to 100° C.

Whilst it is within the ambit of the invention for the polyolefin composition to comprise other polymer components in addition to the propylene butene random copolymer (i) and the ethylene based plastomer (ii), it is preferred if these components (i) and (ii) are the sole polymer components in the polyolefin composition. However, it is to be understood herein that the composition may comprise further components such as additives which may optionally be added in a mixture with a carrier polymer, i.e. in so called master batch.

It will be appreciated that one or more additives known in the art of polymer processing can also be included in the composition. Suitable additives include fillers; lubricants; processing aids; antioxidants; UV absorbers; light stabilisers; nucleating agents; foaming or blowing agents; clarifiers and pigments.

In one particularly embodiment, the polyolefin composition further comprises a soluble nucleating agent as clarifier. The soluble nucleating agent according the present invention may be selected from the group consisting of: sorbitol derivatives, e.g. di(alkylbenzylidene)sorbitols as 1,3:2,4-dibenzylidene sorbitol, 1,3:2,4-di(4-methylbenzylidene) sorbitol, 1,3:2,4-di(4-ethylbenzylidene) sorbitol and 1,3:2,4-Bis(3,4-dimethylbenzylidene) sorbitol, as well as nonitol derivatives, e.g. 1,2,3-trideoxy-4,6;5,7-bis-O-[(4-propylphenyl)methylene] nonitol, and benzene-trisamides like substituted 1,3,5-benzenetrisamides as N,N',N"-tris-tert-butyl-1,3,5-benzenetricarboxamide, N,N',N"-tris-cyclohexyl-1,3,5-benzene-tricarboxamide and N-[3,5-bis-(2,2-dimethyl-propionylamino)-phenyl]-2,2-dimethyl-propionamide, wherein 1,3:2,4-Bis(3,4-dimethylbenzylidene) sorbitol and N-[3,5-bis-(2,2-dimethyl-propionylamino)-phenyl]-2,2-dimethyl-propionamide are equally preferred, and 1,3:2,4-Bis(3,4-dimethylbenzylidene). Sorbitol is especially preferred.

The additives may be present in amounts in the range of 0.1 to 10.0 wt %, preferably 0.5 to 10.0 wt %, relative to the total weight of the composition as a whole.

The composition of the invention may be prepared by any suitable method. Ideally, a method is used which produces a homogenous mixture of the various components. Typically, compounding is employed. Compounding usually involves mixing or/and blending the various components in a molten state, often by extrusion. Such methods will be well known to the person skilled in the art.

Applications

Still further, the present invention relates to an article comprising the polyolefin composition as described above and to the use of such a polyolefin composition for the production of an article. Preferable articles include films and moulded articles.

The films may be prepared by any known method in the art, such as casting or extrusion. The films may be multilayer or monolayer films, but are preferably monolayer films. Moreover, the films preferably consist of the polyolefin composition as the sole polymer component.

As used herein the term "moulded article" is intended to encompass articles that are produced by any conventional moulding technique, e.g. injection moulding, stretch moulding, compression moulding, rotomoulding or injection stretch blow moulding. Articles produced by injection moulding, stretch moulding, or injection stretch blow moulding are preferred. Articles produced by injection moulding are especially preferred.

The moulded articles preferably are thin-walled articles having a wall thickness of 300 micrometer to 2 mm. More preferably the thin-walled articles have a wall thickness of 300 micrometer to 1400 micrometer, and even more preferably the thin-walled articles have a wall thickness of 500 micrometer to 900 micrometer.

The moulded articles of the current invention can be containers, such as cups, buckets, beakers, trays or parts of such articles, such as see-through-windows, lids, or the like.

The articles the invention may be employed in a number of end applications, in particular thin wall packaging applications and food packaging applications. The articles of the current invention are especially suitable for containing food, especially frozen food, such as ice-cream, frozen liquids, sauces, pre-cooked convenience products, and the like.

It will be appreciated that any parameter mentioned above is measured according to the detailed test given below. In any parameter where a narrower and broader embodiment are disclosed, those embodiments are disclosed in connection with the narrower and broader embodiments of other parameters.

The invention will now be described with reference to the following non-limiting examples.

Test Methods:

Melt Flow Rate

The melt flow rate (MFR) is determined according to ISO 1133 and is indicated in g/10 min. The MFR is an indication of the melt viscosity of the polymer. The MFR is determined at 190° C. for PE and 230° C. for PP. The load under which the melt flow rate is determined is usually indicated as a subscript, for instance $MFR_2$ is measured under 2.16 kg load (condition D).

Density

Density of the polymer was measured according to ISO 1183/1872-2B.

For the purpose of this invention the density of the blend can be calculated from the densities of the components according to:

$$\rho_b = \sum_i w_i \cdot \rho_i$$

where $\rho_b$ is the density of the blend,
$w_i$ is the weight fraction of component "i" in the blend and
$\rho_i$ is the density of the component "i".

Quantification of Microstructure by NMR Spectroscopy

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probe head at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {klimke06, parkinson07, castignolles09} Standard single-pulse excitation was employed utilising the NOE at short recycle delays {klimke06, pollard04} and the RS-HEPT decoupling scheme. {fillip05, griffin07} A total of 1024 (1 k) transients were acquired per spectra using a 3 s recycle delay.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm {randall89}.

Basic comonomer content method spectral analysis method:

Characteristic signals corresponding to the incorporation of 1-butene were observed {randall89} and the comonomer content quantified in the following way. The amount of 1-butene incorporated in PPBPP isolated sequences was quantified using the integral of the $\alpha B2$ sites at 43.6 ppm accounting for the number of reporting sites per comonomer:

$$B=I_\alpha/2$$

The amount of 1-butene incorporated in PPBBPP double consecutively sequences was quantified using the integral of the $\alpha\alpha B2B2$ site at 40.5 ppm accounting for the number of reporting sites per comonomer:

$$BB=2*I_{\alpha\alpha}$$

When double consecutive incorporation was observed the amount of 1-butene incorporated in PPBPP isolated sequences needed to be compensated due to the overlap of the signals $\alpha B2$ and $\alpha B2B2$ at 43.9 ppm:

$$B=(I_\alpha-2*I_{\alpha\alpha})/2$$

The total 1-butene content was calculated based on the sum of isolated and consecutively incorporated 1-butene:

$$B\text{total}=B+BB$$

The amount of propene was quantified based on the main $S\alpha\alpha$ methylene sites at 46.7 ppm and compensating for the relative amount of $\alpha B2$ and $\alpha B2B2$ methylene unit of propene not accounted for (note B and BB count number of butene monomers per sequence not the number of sequences):

$$P\text{total}=I_{S\alpha\alpha}+B+BB/2$$

The total mole fraction of 1-butene in the polymer was then calculated as:

$$fB=B\text{total}/(B\text{total}+P\text{total})$$

The full integral equation for the mole fraction of 1-butene in the polymer was:

$$fB=(((I_\alpha-2*I_{\alpha\alpha})/2)+(2*I_{\alpha\alpha}))/(I_{S\alpha\alpha}+((I_\alpha-2*I_{\alpha\alpha})/2)+((2*I_{\alpha\alpha})/2))+((I_\alpha-2*I_{\alpha\alpha})/2)+(2*I_{\alpha\alpha}))$$

This simplifies to:

$$fB=(I_\alpha/2+I_{\alpha\alpha})/(I_{S\alpha\alpha}+I_\alpha+I_{\alpha\alpha})$$

The total incorporation of 1-butene in mole percent was calculated from the mole fraction in the usual manner:

$$B[\text{mol }\%]=100*fB$$

The total incorporation of 1-butene in weight percent was calculated from the mole fraction in the standard manner:

$$B[\text{wt }\%]=100*(fB*56.11)/((fB*56.11)+((1-fB)*42.08))$$

Details of these procedures can be found in Katja Klimke, Matthew Parkinson, Christian Piel, Walter Kaminsky Hans Wolfgang Spiess, Manfred Wilhelm, *Macromol. Chem. Phys.* 2006, 207, 382; Matthew Parkinson, Katja Klimke, Hans Wolfgang Spiess, Manfred Wilhelm, *Macromol. Chem. Phys.* 2007, 208, 2128; Patrice Castignolles, Robert Graf, Matthew Parkinson, Manfred Wilhelm, Marianne Gaborieau: *Polymer* 2009, 50, 2373; M. Pollard, K. Klimke, R. Graf, H. W. Spiess, M. Wilhelm, O. Sperber, C. Piel, W. Kaminsky, *Macromolecules* 2004, 37, 813; Xenia Filip, Carmen Tripon, Claudiu Filip, *J. Magn. Reson.* 2005, 176, 239; John M. Griffin, Carmen Tripon, Ago Samoson, Claudiu Filip, Steven P. Brown, *Mag. Res. in Chem.* 2007, 45(S1), S198; J. Randall Rev. *Macromol. Chem. Phys.* 1989, C29, 201.

Molecular Weight & Molecular Weight Distribution

Molecular weight averages, molecular weight distribution (Mn, Mw, Mz MWD)

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N}(A_i/M_i)} \quad (1)$$

$$M_w = \frac{\sum_{i=1}^{N}(A_i \times M_i)}{\sum_{i=1}^{N} A_i} \quad (2)$$

$$M_z = \frac{\sum_{i=1}^{N}(A_i \times M_i^2)}{\sum_{i=1}^{N}(A_i/M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 µL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$$K_{PS}=19\times10^{-3} \text{ mL/g}, \alpha_{PS}=0.655$$

$$K_{PE}=39\times10^{-3} \text{ mL/g}, \alpha_{PE}=0.725$$

$$K_{PP}=19\times10^{-3} \text{ mL/g}, \alpha_{PP}=0.725$$

A third order polynomial fit was used to fit the calibration data.

All samples were prepared in the concentration range of 0.5-1 mg/ml and dissolved at 160° C. for 2.5 hours for PP or 3 hours for PE under continuous gentle shaking.

Flexural Modulus (FM)

The flexural modulus was determined in a 3-point-bending test at 23° C. according to ISO 178 on 80×10×4 mm³ test bars injection moulded in line with EN ISO 1873-2.

Differential Scanning Calorimetry (DSC)

Differential scanning calorimetry (DSC) analysis, melting temperature ($T_m$) and melt enthalpy ($H_m$), crystallization temperature ($T_c$), and heat of crystallization ($H_c$, $H_{CR}$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and melt enthalpy (Hm) are determined from the second heating step.

Throughout the patent the term Tc or (Tcr) is understood as Peak temperature of crystallization as determined by DSC at a cooling rate of 10 K/min.

Haze

Haze is determined according to ASTM D1003-00 on 60×60×1 mm3 plaques injection molded in line with EN ISO 1873-2

Notched Impact Strength (NIS)

The Charpy notched impact strength (NIS) was measured according to ISO 179 1 eA at +23° C. or at 0° C. respectively, using injection molded bar test specimens of 80×10×4 mm³ prepared in accordance with EN ISO 1873-2.

Charpy notched impact strength measured as defined above at +23° C. is denominated as (NIS+23° C.).

Charpy notched impact strength measured as defined above at 0° C. is denominated as (NIS 0° C.).

Optomechanical Ability (OMA)

Optomechanical ability (OMA) is understood as the ratio of mechanical (especially impact and flexural) behaviour, to optical performance, namely haze, wherein the mechanical properties are targeted to be as high as possible and the optical performance is desired to be as low as possible. The optomechanical ability is determined according the formula given below:

$$OMA = \frac{\text{Flex Modulus [MPa]} * NIS\left[\frac{kJ}{m^2}\right]}{\text{Haze (1 mm) [\%]}}$$

EXPERIMENTAL

Materials

Propylene based plastomer (PP plast): a random propylene ethylene metallocene plastomer, density=0.862 g/cm$^3$, MFR$_2$ (230° C., 2.16 kg)=20 g/10 min Ethylene based plastomer (1) (PE plast 1): an ethylene octene metallocene plastomer, density=0.902 g/cm$^3$, MFR$_2$ (190° C./2.16 kg)=1.1 g/10 min Ethylene based plastomer (2) (PE plast 2): an ethylene octene metallocene plastomer, density=0.883 g/cm$^3$, MFR$_2$ (190° C./2.16 kg)=1.1 g/10 min Ethylene based plastomer (3) (PE plast 3): an ethylene octene metallocene plastomer, density=0.902 g/cm$^3$, MFR$_2$ (190° C./2.16 kg)=30 g/10 min Production of the Multimodal Propylene Butene Copolymer of the Invention (PP copo)

The catalyst used in the polymerisation processes for the random copolymer composition of the inventive example (IE1) was prepared as follows:

The metallocene (MC1) (rac-anti-dimethylsilandiyl(2-methyl-4-phenyl-5-methoxy-6-tert-butyl-indenyl)(2-methyl-4-(4-tert-butylphenyl)indenyl)zirconium dichloride) has been synthesized as described in WO 2013/007650.

The catalyst was prepared using metallocene MC1 and a catalyst system of MAO and trityl tetrakis(pentafluorophenyl)borate according to Catalyst 3 of WO 2015/11135 with the proviso that the surfactant is 2,3,3,3-tetrafluoro-2-(1,1,2,2,3,3,3-heptafluoropropoxy)-1-propanol.

The PP copo was prepared in a two stage polymerisation process, under the conditions outlined in Table 1, using the catalyst as defined above. Properties of the various fractions and final multimodal copolymer are also presented in Table 1.

TABLE 1

| Production Data for multimodal propylene butene copolymer (PP copo) | | |
|---|---|---|
| | Unit | IE1 |
| Prepolymeriser | | |
| Temperature | ° C. | 20 |
| Residence time | Min | 20 |
| Loop | | |
| Temp. | ° C. | 75 |
| Feed H2/C3 ratio | mol/kmol | 0.1 |
| Feed C4/C3 ratio | mol/kmol | 28.4 |
| Split | t % | 45 |
| MFR$_2$ | g/10 min | 2.0 |
| C4 content | wt % | 5.0 |
| First GPR | | |
| Temp. | ° C. | 80 |
| H2/C3 ratio | mol/kmol | 1.0 |
| C4/C3 ratio | mol/kmol | 26 |
| Split | % | 55 |
| C4 content | wt % | 2.6 |
| Pellet | | |
| C4 total (wt %) | wt % | 3.74 |
| MFR (g/10 min) | g/10 min | 1.0 |

INVENTIVE AND COMPARATIVE COMPOSITIONS

Five inventive (IE1 to IE5) and two comparative (CE1 & CE2) compositions were prepared with the components in amounts as shown in Table 2. The components were compounded together on a ZSK 18 twin screw extruder with a melt temperature of 220° C., throughput 7 kg/h, and then injection moulded into specimens for testing. Properties of the compositions are shown in Table 2.

TABLE 2

| Properties of injection moulded samples of Inventive and Comparative compositions | | | | | | | | |
|---|---|---|---|---|---|---|---|---|
| | | IE1 | IE2 | IE3 | IE4 | IE5 | CE1 | CE2 |
| Components (wt %) | | 80% PP copo 20% PE plast 1 | 80% PP copo 20% PE plast 2 | 90% PP copo 10% PE plast 1 | 65% PP copo 35% PE plast 1 | 80% PPcopo 20% PE plast 3 | 100% PP copo | 80% PP copo 20% PP plast |
| MFR | g/10 min | 1.58 | 1.64 | 1.76 | 1.65 | 2.81 | 1 | 1.95 |
| Tc | ° C. | 107 | 107 | 106 | 106 | 106 | 108 | 107 |
| Tm1 | ° C. | 143 | 143 | 144 | 143 | 143 | 143 | 143 |
| Tm2 | ° C. | 96 | 74 | n.d. | 75 | 97 | 128 | n.d. |
| Hm1 | J/g | 61 | 63 | 76 | 48 | 61 | 81 | 74 |
| Hm2 | J/g | 18 | 4 | n.d. | 8 | 17 | 1.1 | n.d. |
| Flexural Modulus | MPa | 873 | 820 | 984 | 616 | 821 | 1227 | 647 |
| Haze | % | 26.7 | 27.6 | 35.8 | 21.6 | 25.9 | 44 | 42 |
| NIS/23° C. | kJ/m$^2$ | 35.5 | 54.7 | 21.4 | 86.1 | 15.2 | 4.7 | 47.5 |
| NIS/0° C. | kJ/m$^2$ | 3.3 | 3.8 | 3.1 | 64.1 | 3.6 | n.m. | 3.4 |
| OMA/23° C. | kJ/m$^2$ | 1159 | 1624 | 589 | 2460 | 484 | 131 | 732 |
| OMA/0° C. | kJ/m$^2$ | 108 | 114 | 85 | 1831 | 113 | n.m. | 52 |

The invention claimed is:

1. A polyolefin composition comprising:
   (i) 55 to 95 wt % of a propylene butene random copolymer having an MFR$_2$ of 1.0 to 20.0 g/10 min, a butene content of 1.5 to 8.0 wt % and prepared using a single site catalyst; and
   (ii) 5 to 45 wt % of an ethylene based plastomer having a density of 860 to 905 kg/m$^3$, an MFR$_2$ of 0.3 to 30 g/10 min and prepared using a single site catalyst,
   wherein the propylene butene random copolymer (i) and the ethylene based plastomer (ii) are the sole polymer components in the composition.

2. The polyolefin composition as claimed in claim 1, wherein the propylene butene random copolymer is a multimodal copolymer comprising:
   (A) 30 to 70 wt % of a propylene butene copolymer having an MFR$_2$ of 0.5 to 20.0 g/10 min and a butene content of 0.5 to 10.0 wt %; and
   (B) 70 to 30 wt % of a propylene butene copolymer having an MFR$_2$ of 0.5 to 20.0 g/10 min and a butene content of 1.0 to 8.0 wt %;
   wherein copolymers (A) and (B) are different.

3. The polyolefin composition as claimed in claim 1, wherein said single site catalyst is a metallocene catalyst.

4. The polyolefin composition as claimed in claim 1, wherein the butene content of said propylene butene copolymer is in the range 3.0 to 5.0 wt %.

5. The polyolefin composition as claimed in claim 1, wherein said propylene butene random copolymer is substantially free of ethylene.

6. The polyolefin composition as claimed in claim 1, wherein the ethylene based plastomer is a copolymer of ethylene and at least one C3-C10 alpha-olefin.

7. The polyolefin composition as claimed in claim 1, wherein said composition has a flexural modulus of at least 550 MPa.

8. The polyolefin composition as claimed in claim 1, wherein said composition has a haze of 40% or less.

9. The polyolefin composition as claimed in claim 2, wherein the comonomer content of Fraction (B) is less than the comonomer content of Fraction (A).

10. A process of making the composition as defined in claim 1, comprising mixing and/or blending the propylene butene random copolymer and the ethylene based plastomer.

11. The process as defined in claim 10, wherein the propylene butene random copolymer is prepared by a process comprising:
    (i) polymerising propylene and butene in a first polymerisation stage in the presence of a single site catalyst to prepare a first propylene butene copolymer having a MFR$_2$ from 0.5 to 20.0 g/10 min and a butene content of 0.5 to 10.0 wt %;
    (ii) polymerising propylene and butene in a second polymerisation stage in the presence of said catalyst and said first propylene butene copolymer to prepare said random copolymer.

12. The process as claimed in claim 11, wherein the first polymerisation stage is carried out in a loop reactor and the second polymerisation stage is carried out in a gas phase reactor.

13. An article comprising the polyolefin composition as defined in claim 1.

14. The article as claimed in claim 13, wherein said article is a film or a moulded article.

15. The process of claim 10, wherein the mixing and/or blending comprises a step of extrusion.

16. A process of making an article comprising the polyolefin composition of claim 1.

* * * * *